United States Patent
Harben, Jr. et al.

[15] 3,651,939
[45] Mar. 28, 1972

[54] POULTRY SIZER

[72] Inventors: Grover S. Harben, Jr., Gainesville; Ernest E. Lewis, Flowery Branch; Lloyd E. Sloan, Gainesville, all of Ga.

[73] Assignee: Gainesville Machine Company, Inc., Gainesville, Ga.

[22] Filed: Aug. 31, 1970

[21] Appl. No.: 68,215

[52] U.S. Cl. .................................................209/121
[51] Int. Cl. .................................................B07c 5/16
[58] Field of Search ...........................209/121, 74

[56] References Cited

UNITED STATES PATENTS 2,876,901  3/1959  Roth ........................................209/121
3,291,303  12/1966  Altenpohl, Jr. ..........................209/121
3,511,370  5/1970  Taylor ..................................209/121 X Primary Examiner—Allen N. Knowles
Attorney—Newton, Hopkins & Ormsby

[57] ABSTRACT

Apparatus for sizing poultry by weight includes a plurality of spaced weighing stations each of which is responsive to a predetermined and different weight. A series of trolley devices moves the poultry successively through the weighing stations, and ejecting mechanism is associated with each station so that the poultry is ejected at the proper station be weight. In one form of the invention, the arrangement of the weighing beam and counterbalancing weight is such that poultry is ejected whenever its weight exceeds a predetermined limit. In another form of the invention, poultry is ejected only when it is at or about a predetermined weight.

6 Claims, 6 Drawing Figures

PATENTED MAR 28 1972　　3,651,939

INVENTORS
GROVER S. HARBEN, Jr
ERNEST E. LEWIS
L. E. SLOAN

BY *Newton, Hopkins, & Ormsby*

ATTORNEYS

3,651,939

POULTRY SIZER

BACKGROUND OF THE INVENTION

After poultry has been cleaned and dressed, it is necessary to grade the poultry by weight. The gradations by weight should be as accurate and small as possible to avoid overage. This can be accomplished, of course, by meticulous hand weighing, but the time and expense involved is not practical. Therefore, various devices have been developed for quickly grading poultry by weight and may involve the utilization of a plurality of weighing stations over which a line of poultry is passed and with there being ejection apparatus associated with each station to eject a bird when it weighs within certain limits. Usually, such arrangements are either of low accuracy if made inexpensively, or are of great complexity and therefore expensive if they will attain a high degree of accuracy.

BRIEF SUMMARY OF THE INVENTION

It is, therefore, the object of this invention to provide apparatus for grading or sizing poultry by weight in which the grading is characterized by high accuracy and relative small weight limits, while at the same time achieving these ends by relatively simple and inexpensive mechanism.

Briefly, the apparatus according to the present invention involves the use of a plurality of successive weighing stations over which a line of poultry is moved, and in which weighing beams are utilized such that when the weights associated with these beams and which are adjusted to respond to different weight values of the poultry are overbalanced, ejector means is actuated to kick the appropriate bird from the line into a suitable receptacle or the like.

In one embodiment of the invention, the ejection is effected whenever a bird exceeds some predetermined weight and with the differences in these predetermined weights at successive weighing stations being only slightly different such that a high degree of accuracy is attained. To eliminate overage at the first weighing station, a second embodiment of the invention uses a system wherein the overbalanced movement of the weighing beam causes the weight thereof to counterbalance the weight of the poultry whereby the weighing beam seeks a stabilized position with respect to a particular weight of the bird. Switch mechanisms are so placed relative to the weighing beam that when it is in its stabilized position, the ejector means is actuated but is otherwise inoperative.

DETAILED DESCRIPTION OF THE INVENTION

Figures 1, 4:
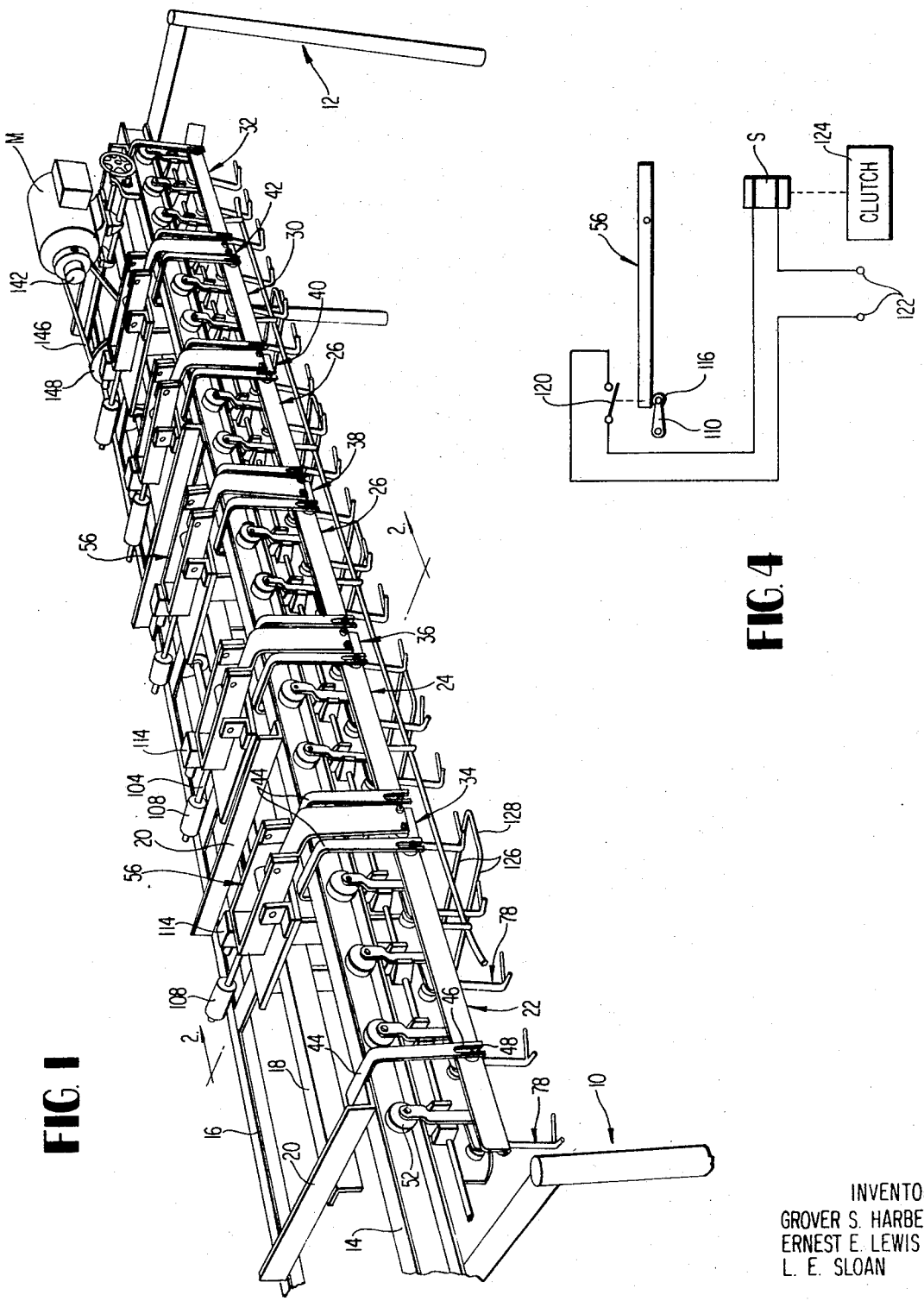
FIG. 1 is a perspective view of a sizing device constructed according to the present invention, and illustrating a complete embodiment thereof.
FIG. 4 is a diagrammatical view illustrating the circuit according to one embodiment of the invention.

Referring to FIG. 1, the sizing or grading apparatus shown therein includes a rigid frame having suitable supports 10 and 12, and extending between them an overhead support I-beam 14. Further, there is provided the longitudinally extending frame members 16 and 19 and the cross frame members such as those indicated by the reference characters 20.

Located beneath the overhead support 14 are a plurality of track sections indicated generally by reference characters 22, 24, 26, 28 30 and 32, which track sections, as will hereinafter appear, are disposed in longitudinal alignment with one another but in spaced relationship to provide gaps or interruptions in the trackway defined by these sections and within which there are received the associated weighing platforms indicated generally by reference characters 34, 36, 38, 40 and 42 in FIG. 1. The weighing stations associated with the several weighing platforms are adjusted or set to respond to different predetermined weights of poultry and each has an ejecting means associated therewith to kick the poultry off the line at the weighing station if the weight response of the weighing station is such as to effect the actuation of the ejecting means.

The track sections are suspended from the overhead support 14 by means of the U-shaped brackets 44, the legs of which are slotted as indicated at 46 for the reception of suitable fasteners 48 whereby some vertical adjustment of the track sections for alignment purposes is allowed.

Figure 2:
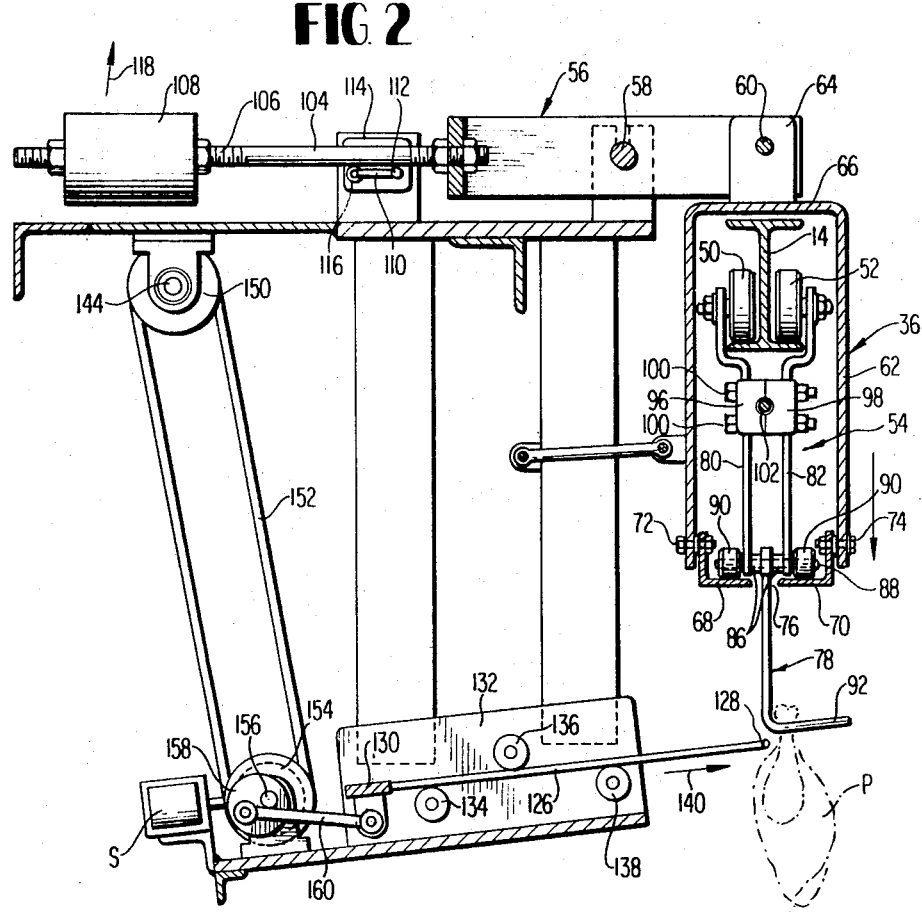
FIG. 2 is an enlarged transverse section taken along the plane of section line 2—2 in FIG. 1 illustrating details of a weighing station including the ejector mechanisms.

As can be seen in FIG. 2, the lower flanges of the overhead support I-beam 14 provide tracks for a pair of rollers or wheels 50 and 52, which wheels form part of a trolley mechanism 54, a plurality of which are joined together as hereinafter described for successive passage past each of the weighing stations. FIG. 2 also illustrates the construction of the weighing and ejecting mechanism at each station. A weighing beam 56 is disposed in each station and is provided with a fulcrum or pivot pin 58 pivoting the weighing beam between its ends on the frame structure of the device, and one end of the weighing beam is pivotally connected as by a pin 60 to an associated weighing platform mechanism, such as the weighing platform 36 illustrated in FIG. 2.

The weighing platform in each case consists of an inverted U-shaped frame 62 having upstanding ears or brackets 64 on its bight portion 66 which cooperate with the aforementioned pivot pin 60, and the depending legs of the frame are attached to respective platform track members 68 and 70 by means of suitable fasteners 72 and 74. The two track platform sections 68 and 70 define a clearance gap 76 therebetween through which a carrier fork assembly 78 projects as hereinafter is more particularly described.

Figure 3:
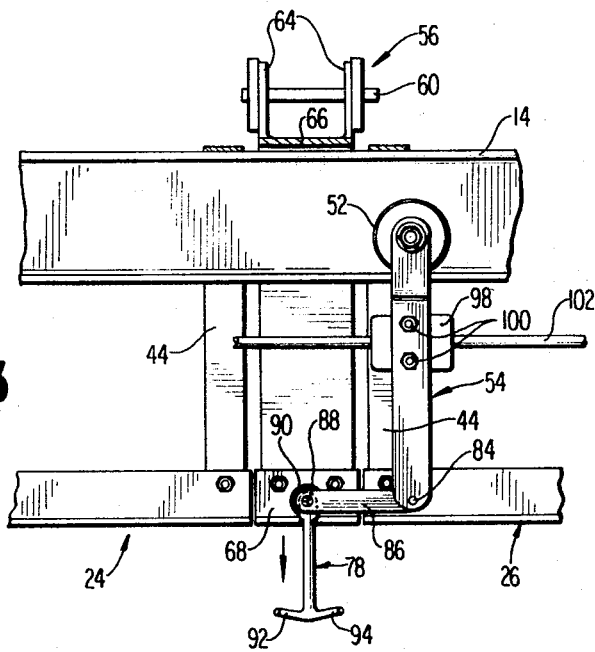
FIG. 3 is a vertical section taken through the device at a weighing station.

Each trolley 54 has opposite substantially vertical side frame members 80 and 82 which are pivotally connected at their lower ends as by an axle or cross pin member 84, as shown in FIG. 3, to the legs 86 which trail the trolley 54. The free ends of these legs 86 are joined by the axle 88 which carries a pair of wheels 90, see particularly FIG. 2, which travel along the track sections and pass also over the platform track portions 68 and 70, as clearly shown.

The fork assembly 78 is also pivotally carried at its upper end on the axle 88, and its lower end is laterally projected and bifurcated in outwardly divergent fashion to provide a crotch between the two arms 72 and 94. Each crotch allows a leg of a bird, such as that indicated by P in FIG. 2, to remain captive within the crotch as illustrated by dashed line in FIG. 2. It will also be clear from FIG. 3 that the two members 80 and 82 of each trolley are joined together by the clamping blocks 96 and 98 under the action of suitable fasteners 100, the clamping blocks also serving to affix each trolley to the cable 102 which forms a part of an endless conveyor mechanism driven by any suitable means for effecting movement of the line of poultry through the apparatus.

Of course, it will be appreciated that the track sections 22—32 are formed similarly to the sections 68 and 70 of the weighing platforms, that is, each track section includes two L-shaped and separated portions which are aligned in spaced relation as set forth hereinabove, and with the weighing platforms substantially filling the gap or interruptions in the substantially continuous track weighing defined.

Each weighing beam 56 may be provided with the extension 104 detachably secured thereto, as shown, and which preferably includes a threaded end portion 106 upon which a weight member 108 is affixed for adjustment to the proper spacing of its center of mass from the fulcrum pin 58. A switch is provided in association with the weighing beam, and preferably includes an actuator portion 110 pivotally connected as at 112 to the body 114 and it may be provided with a follower 116 engaging the underside of the weighing beam 56, as shown in FIG. 2.

In the embodiment of the invention shown in FIG. 2, it will be noted that the center of mass of the weight 108 is essentially aligned with the axes of the pivotal connections 58 and 60 so that if the weight acting at the pin 60 exceeds that value which will overbalance the weight 108, the weighing beam 56 will move from the normal position shown, shifting the weight 108 on the arc 118 so that the weighing beam will continue to move until the underside of its bight 66 engages the overhead support 14. During this process, the switch arm 110 will follow the movement of the weighing beam until the switch, as shown in FIG. 4, reaches a closed condition.

As shown in FIG. 4, the weighing beam as illustrated diagrammatically cooperates with actuator 110 for the switch, the movable contact 120 of the switch normally being disposed in open position as illustrated. When the weighing beam 56 is overbalanced, the switch contact 120 closes the circuit from the supply terminals 122 through the solenoid S which actuates a clutch mechanism 124 and thus initiates operation of the ejecting mechanism.

The injecting mechanism is shown more clearly in FIG. 2, and will be seen to include a wire frame including the opposite parallel legs 126 (see also FIG. 1) joined by a bight portion 128 which actually accomplishes the ejecting action, the opposite ends of the legs 126 being fixed to cross bar member 130. For each ejector mechanism, the frame of the machine mounts a pair of vertical plates 132 and each carries a series of rollers 134, 136 and 138 constraining the wire frame for rectilinear reciprocatory motion. The initiating position of the bight 128 being as shown in FIG. 2 just below the path of the forks 78 and being adapted to sweep thereunder and kick poultry P from engagement with the fork when actuated, the direction of movement being indicated by the arrow 140.

Motive power for the ejector mechanisms is provided by the motor M, FIG. 1, whose output shaft 142 is connected to the constantly rotating ejector power shaft 144 (FIG. 2) through a suitable belt 146 and associated pulley 148. Each ejector station is provided with an output pulley 150 connected through a belt 152 and a pulley-one revolution clutch 154 to the output shaft 156 of the associated ejector station. Each output shaft 156 carries an eccentric 158 which is coupled through a connecting rod 160 to the associated cross bar 130, as is clearly shown in FIG. 2. The solenoid S in each case actuates the one revolution clutch to allow 360° rotation of the output shaft 156 and associated eccentric 158 from the constantly running input shaft 144. The one revolution clutch may be of any conventional form.

Figure 5:
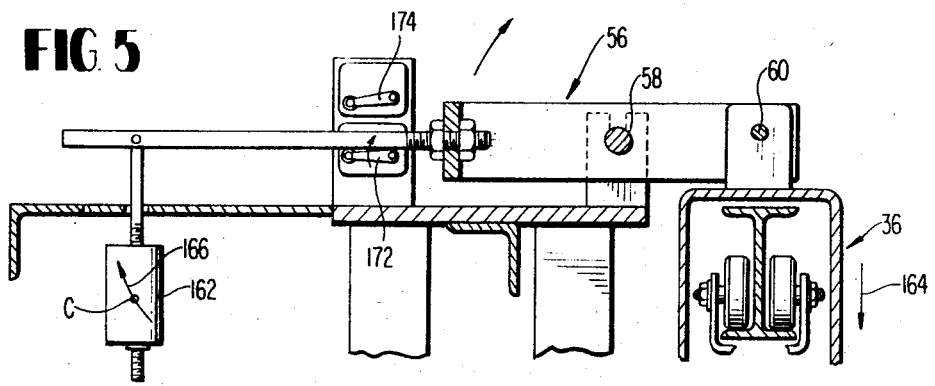
FIG. 5 is a view similar to FIG. 2, but illustrating a modified form of the invention.
Figure 6:
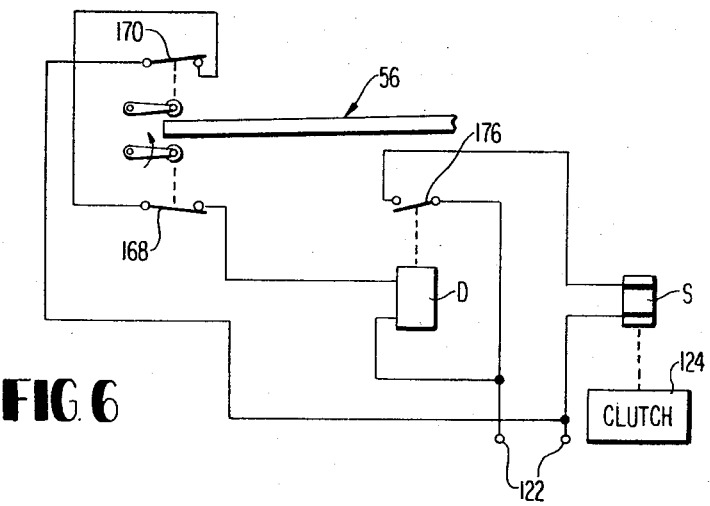
FIG. 6 is a diagrammatical view illustrating the circuit according to the modification of FIG. 5.

In the modification according to the FIGS. 5 and 6, there is a slightly different relationship between the weight 162 and the fulcrum pin 58 as compared with the arrangement described above. In FIG. 5, the center of mass C of the weight 162 is located below the axis of the fulcrum pin 58 so that when the poultry overbalances the weight as indicated by movement in the direction of the arrow 164, the center of mass will move on an arc as indicated by the arrow 166 laterally to shift this center of mass and thereby effectively increasing the lever arm acting about the axis of the fulcrum pin 58.

These are two switches associated with each weighing beam 56 as indicated by reference characters 168 and 170 in FIG. 6. The lower switch whose actuator is indicated by the reference character 172 is normally maintained in open condition by the weighing beam 56, whereas the other switch whose actuator is indicated by the reference character 174 is normally maintained in closed condition until it is urged to open condition by engagement of the weighing beam 56 therewith.

The spacing between the actuators 172 and 174 is such that for a small angular movement of the weighing beam 56, both switches will be in closed condition and this is illustrated in FIG. 6. If the weight acting on the platform 36 is just sufficient to position the weighing beam 56 such that the weight 162 effectively counterbalances the platform weight, the beam will seek and remain in the stabilized position shown in FIG. 6. If the platform weight is too little, the switch 168 will, of course, remain open, and, on the other hand, if the platform weight is too great, it will overbalance and engage and open the switch 107. Thus, since the two switches 168 and 170 are in series, the platform weight which causes the stabilized position of the weighing beam 56 is the only platform weight which will cause actuation of the device and effect ejection of the poultry. Since the switch 170 is normally closed and there is some overlap in closing of the switch 168 before the switch 170 is opened due to too great a platform weight, a time delay solenoid D is interposed in the control circuitry. This time delay device, of any conventional form, has a short time delay so that the system will respond only to a stabilized position of a weighing beam when both switches 168 and 170 are closed. Only then will it close its associated switch 176 to complete the circuit to the solenoid S whereby the one revolution clutch mechanism 154 is actuated to initiate the ejection cycle. This arrangement will also make the weighing assembly insensitive to inertia loading.

Whereas it will be appreciated that in the system according to FIGS. 1–4 the first station must necessarily actuate the ejection of the heaviest grade of poultry with successively lesser gradations at successive weighing stations, the system according to FIGS. 5 and 6 need not be so ordered since the arrangement in each case may be made to respond to only a particular weight within narrow limits.

I claim:

1. Apparatus for sizing poultry according to weight comprising, in combination,
a horizontally elongate frame including a longitudinally extending overhead support and a series of spaced track sections disposed therebelow, said track sections being aligned with one another and having similar spacings therebetween to define a series of weighing stations at the interruptions between said track sections,
a weighing beam pivotally mounted on said frame in lateral alignment with each of said weighing stations,
a weighing platform carried by each of said weighing beams in alignment between each adjacent pair of said track sections and substantially filling the interruptions therebetween to define an essentially continuous trackway along said frame,
a series of trolleys engaging said overhead support,
means for moving said trolleys along said overhead support,
a carrier pivotally attached to each trolley and supported on said trackway in trailing relation to each associated trolley, whereby sequentially to pass over said weighing platforms, each carrier including a laterally projecting, generally horizontal fork presenting an outwardly divergent crotch for hanging a bird from the carrier,
ejector means mounted for lateral ejecting movement beneath each weighing station at a level to pass beneath the crotch of a carrier supported on the associated weighing platform and sweep a bird out of hanging engagement from such crotch, and
actuator means responsive to the presence of a predetermined different weight on each weighing platform for operating each associated ejector means.

2. Apparatus for weight sizing of poultry as defined in claim 1 wherein each weighing beam is horizontally disposed and is pivotally mounted between its ends on said frame above and laterally offset from said overhead support, each weighing platform being vertically elongate, having a trackway section at its lower end and being pivotally connected to one end of an associated weighing beam at its upper end, a link pivotally connected at its opposite ends to an intermediate portion of said weighing platform and said frame and being of an effective length equal to the spacing between the pivot connections of said beam to said frame and said weighing platform whereby to form a parallelogram linkage connection between said weighing platform and said frame, a weight carried by the other end of each weighing beam, and each said actuator means including a switch movable to closed condition in response to weight-overbalanced movement of the associated weighing beam.

3. Apparatus as defined in claim 2 wherein each said weight is substantially aligned with the axes of said pivotal connections of its associated weighing beam.

4. Apparatus as defined in claim 2 wherein each said weight is disposed with its center of mass below a line passing through said pivotal connections of its associated weighing beam whereby weight-overbalanced movement of each weighing beam effectively increases the lever arm of the associated weight.

5. Apparatus as defined in claim 4 wherein each said actuator means also includes a second switch movable to open condition in response to gross overbalancing of the associated weight, the two switches remaining closed upon the presence of a predetermined weight on the associated weighing platform.

6. Apparatus as defined in claim 5 wherein each actuator means includes delay means connected in series with said switches.

* * * * *